No. 813,238. PATENTED FEB. 20, 1906.
T. B. RICE, Jr.
DEVICE FOR PREVENTING THE SHAFTS OR ARBORS OF SAW BLADES
FROM SAGGING.
APPLICATION FILED JUNE 3, 1904.
2 SHEETS—SHEET 1.
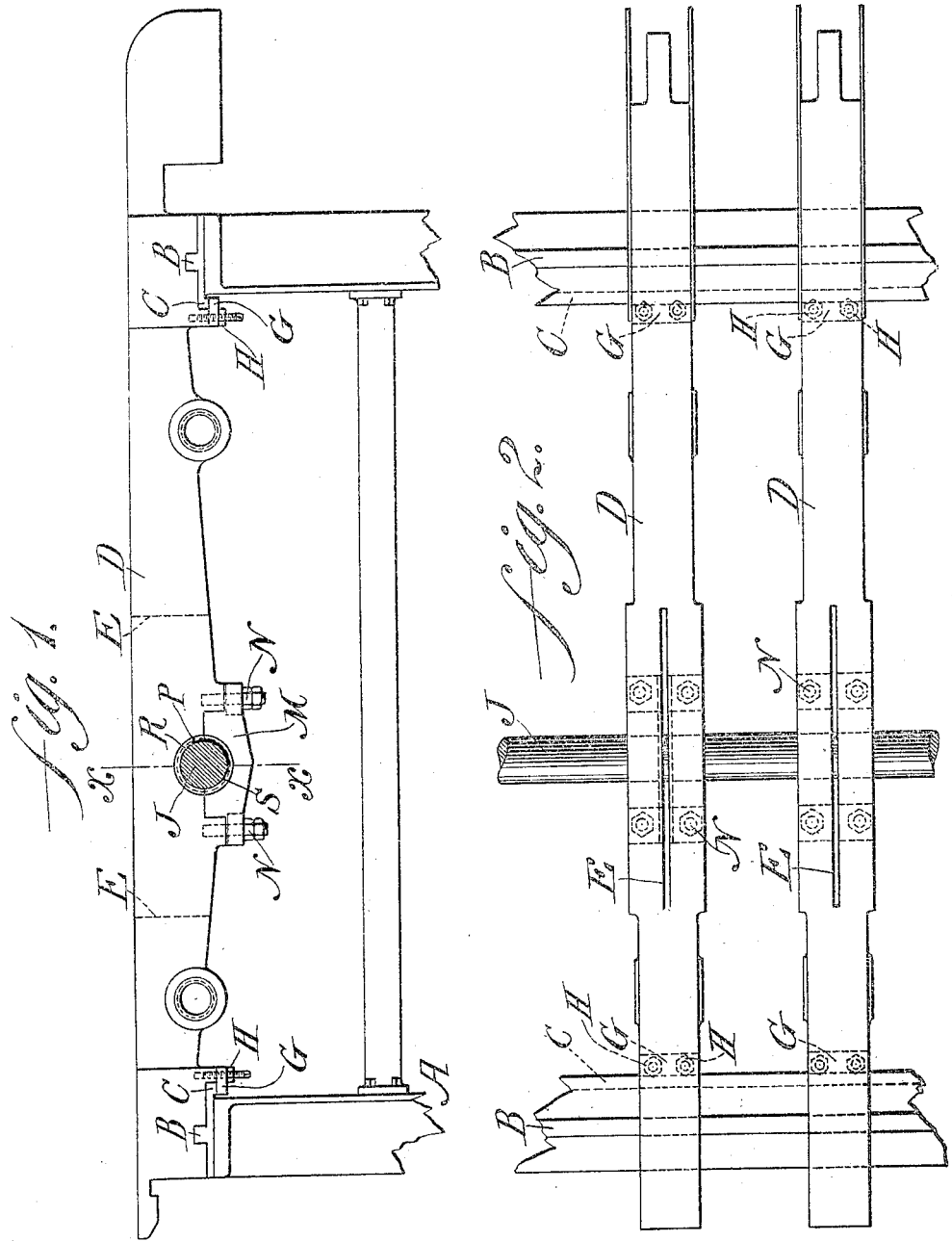
Witnesses
Inventor
Thomas B. Rice, Jr.
By Wiederscheim & Fairbanks
Attorneys

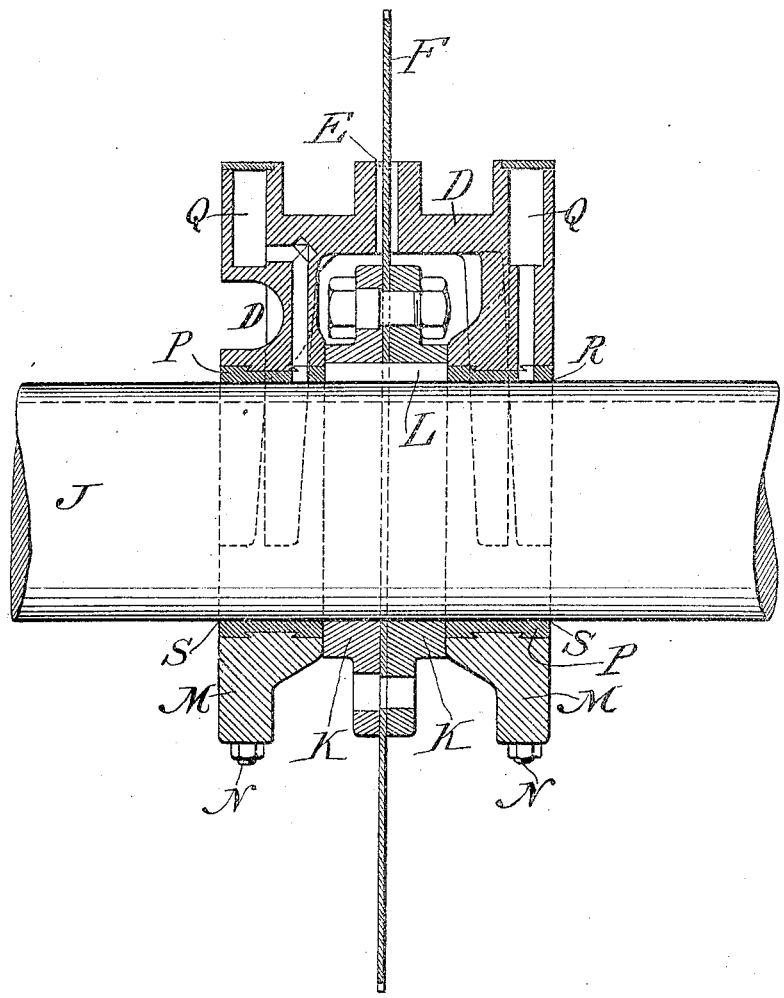

UNITED STATES PATENT OFFICE.

THOMAS B. RICE, JR., OF PHILADELPHIA, PENNSYLVANIA.

DEVICE FOR PREVENTING THE SHAFTS OR ARBORS OF SAW-BLADES FROM SAGGING.

No. 813,238.        Specification of Letters Patent.        Patented Feb. 20, 1906.

Application filed June 3, 1904. Serial No. 210,942.

*To all whom it may concern:*

Be it known that I, THOMAS B. RICE, Jr., a citizen of the United States, residing in the city and county of Philadelphia, State of Pennsylvania, have invented a new and useful Improvement in Devices for Preventing the Shafts or Arbors of Saw-Blades from Sagging, of which the following is a specification.

My invention consists of novel means for supporting a shaft on opposite sides of the saw-blade.

It further consists of novel means for adjusting the position of the blade.

It further consists of novel details of construction, all as will be hereinafter set forth.

Figure 1 represents a side elevation of the sawing-machine embodying my invention and a section of the saw-carrying shaft. Fig. 2 represents a plan view of two cross-heads with the saws omitted and showing a portion of the shaft and frame of the machine. Fig. 3 represents the sectional view on line $x\ x$, Fig. 1, on an enlarged scale, showing a saw in position.

Similar letters of reference indicate corresponding parts in the figures.

Referring to the drawings, A designates the frame of the machine, which is of any suitable construction and upon which are mounted the tracks B, which extend lengthwise of the machine and in the drawings are provided with inwardly-projecting portions, flanges, or pieces C, although it will be understood that the said projections C need not be a part of the tracks B.

D designates a cross-head which is adapted to be mounted and travel on the tracks B on the frame A, the said cross-head having a suitable opening E, through which the saw F projects when in position and said head serving as a support for boards to be sawed in their passage through the machine. Carried on the head D are horizontally-arranged plates or pieces G, which are adapted to engage with any suitable part of the machine and are shown in engagement with the projecting portions C of the tracks B, they being adapted to be held in place by any suitable means—in the present instance by the nuts H.

J designates a shaft to which power is applied in a suitable manner and which is suitably supported with respect to the machine. Upon the said shaft the saw F is mounted, the same being held in position by the collars K, which latter are in engagement with the said shaft—as, for example, by the key or feather L, whereby the said collars can be adjusted longitudinally on said shaft, but serve to hold the saw F thereon, which saw extends through the slot or opening E in the cross-head. Owing to the opening E, through which the saw plays, the body of the cross-head is divided or bifurcated, forming a plurality of side members about the place of occupation of the saw.

The cross-head D is provided with a suitable cut-away portion, as at R, which is adapted to closely fit the shaft J and partly surround the same.

M designates yokes or pillow-blocks, which are secured to the cross-head by the bolts and nuts N, said yokes being provided with a cut-away portion S, in which the shaft is adapted to be seated when the said yokes are in position, it being thus seen that the yokes are secured to the cross-head on either side of the collars K and serve to support the shaft directly on either side at the point where the saw F is keyed to said shaft, the shaft thus having a plurality of bearings, respectively, on the opposite sides of the saw, it being understood that the construction thus described is applicable to each of a plurality of cross-heads D, so that the said shaft is provided wherever a saw is keyed thereto with a support, and as this point where the saw is secured is that where the greatest strain occurs the support prevents sagging or improper bending of the shaft. Suitable antifriction material P may be interposed between the cross-head and the shaft at its bushing, the effect of which is evident, and suitable oil-cups Q may be provided in the head D for evident purposes.

By loosening the pieces G the cross-heads D may be moved on the tracks, it of course being understood that the yokes M and the collars K are likewise loosened in order to permit movement of the saws on the shaft with the cross-heads. In this way the saws and cross-heads can be adjusted with respect to each other, whereby varying widths of boards can be sawed, the said cross-heads, saws, and yokes being again locked after the parts have been placed in the desired position.

I have shown in the drawings the parts referred to and omitted such other features of the machine which are old and which form no part of the present invention, although the same may be necessary in the operation of such a device.

It will be evident that various changes may be made by those skilled in the art which will come within the scope of my invention, and I do not, therefore, desire to be limited in every instance to the exact construction herein shown and described.

Having thus described my invention, what I claim as new, and desire to secure by Letters Patent, is—

1. A saw-carrying shaft, a cross-head, a support for the latter, said head having its body longitudinally divided forming separate side members and blocks connected with the under portions of said members, said body and blocks forming a plurality of bearings for said shaft and firmly sustaining the same respectively on opposite sides of the saw.

2. A shaft, a saw longitudinally movable thereon, a cross-head, a support for the latter, said head having its body longitudinally divided forming separate side members, blocks connected with the under portions of said members and means on said head and support, whereby said head is laterally movable on said support, said body and blocks forming a plurality of bearings for said shaft and firmly sustaining the same respectively on opposite sides of the saw.

3. A frame, a track thereon, a member projecting inwardly from said frame and overhanging the inner side thereof, a saw-carrying shaft, a cross-head forming the bearing for said shaft and being movably supported on said track and a piece projecting outwardly from said cross-head and freely engaging said overhanging member of the frame from below.

4. A frame, a track thereon, a member projecting inwardly from said frame and overhanging the inner side thereof, a saw-carrying shaft, a cross-head forming the bearing for said shaft, and being movably supported on said track, a piece projecting outwardly from said cross-head and freely engaging said overhanging member of the frame from below, and means for vertically adjusting said piece on said cross-head.

THOMAS B. RICE, Jr.

Witnesses:
  A. S. PRATT,
  ENDE HEGH.